May 12, 1970   J. CHOLET ET AL   3,511,333
APPARATUS FOR SEISMIC PROSPECTING ON LAND
Original Filed April 6, 1966   9 Sheets-Sheet 4

United States Patent Office 3,511,333
Patented May 12, 1970

3,511,333
APPARATUS FOR SEISMIC PROSPECTING ON LAND
Jacques Cholet, Rueil-Malmaison, and Gerard Grau, Paris, France, assignors to Institut Francais du Petrole, des Carburants et Lubrifiants, Rueil-Malmaison, France
Continuation of application Ser. No. 540,720, Apr. 6, 1966. This application Aug. 26, 1968, Ser. No. 755,459
Claims priority, application France, Apr. 13, 1965, 13,127; Aug. 31, 1965, 30,023
Int. Cl. G01v 1/12
U.S. Cl. 181—.5                    1 Claim

ABSTRACT OF THE DISCLOSURE

A container with a deformable bottom and filled with liquid rest on the ground. A cartridge is fired within the container for seismic prospecting. A tank filled with liquid is associated with the container. Liquid is withdrawn from the tank to move the cartridge into the container. Liquid passes from the container back to the tank.

Cross-reference to related application

This application is a continuation of our application Ser. No. 540,720, filed Apr. 6, 1966.

The most frequently used method of seismic prospecting on land consists of setting off an explosive charge at the bottom of a shallow bore-hole and of using a series of surface geophones at varying distances from the explosion site to record the elastic waves reflected and/or refracted at the boundaries between the different underground strata.

Such a method has many drawbacks, especially the high cost of the required drilling therefor, the slowness of these operations and the damage caused both by the high-charge explosive and by the busy heavy-vehicle traffic associated with the drilling.

In order to reduce these drawbacks, an easily transportable surface vibrator was conceived that would produce wave trains to replace the shock waves caused by the explosion in the standard method. Unfortunately, the ground energy transmitted by such a vibrator is limited by the downward force that can be permanently applied on its pulsating plate to prevent it from becoming detached from the ground.

In practice, this force is limited to the weight of the vehicle used to transport the vibrator, because this vehicle is jacked up so that its full weight is bearing on the vibrator plate during operations.

For these different reasons, the maximum ground energy transmitted by a vibrator is very weak compared with that generated by an explosion, thus considerably complicating problems of processing the singles received by the geophones, especially in trying to improve the signal noise ratio.

The object of the present method is to obviate the drawbacks of previous methods by avoiding long and costly drilling operations while transmitting to the ground a sufficient amount of energy without having to make use of operational equipment that is difficult to transport.

The main feature of this method is that weak charge explosions are set off (between 0.10 and 100 g., for example) inside a liquid-filled container having a deformable wall in contact with the ground.

So as to transmit as much energy to the ground as possible, it is preferable that the container be shaped so that the ratio between the lower deformable surface and the volume of the container is as great as possible.

Furthermore, in order to improve the efficiency of transmitting energy to the ground and to decrease the volume of the gas bubble generated by the explosion, some advantage may be derived from lengthening the upper part of the container by a tubular column filled with liquid so as to increase the liquid pressure at the base of the container.

In addition, the device according to this invention, non weighted, is relatively light, weighing no more than two metric tons, which is of considerable advantage and which makes it much easier to manoeuver on the terrain the container and its associated devices (forming together what will be called the impulse generator).

The lightness of this impulse generator results in its vertical displacement above the ground as a result of the explosion. When it falls back to the ground after the explosion, a second signal is generated which disturbs the emitted seismic signal.

In order to eliminate these disturbances, the present invention provides means whereby the impulse generator is prevented from forming parasite signals of this sort. These methods may, for example, consist of a system absorbing the shock resulting from the fall of the generator, or locking means to prevent it from rising off the ground.

The invention will be described hereunder in greater detail with references to the accompanying drawings showing various embodiments of the explosion generator and its allied equipment.

FIG. 1 diagrammatically shows a cross section of a container including a tubular upper part housing the submerged part of a cartridge explosion system.

FIG. 2 diagrammatically shows a cross section of a differently shaped container housing the submerged part of a cartridge explosion system.

FIGS. 7 and 7a illustrate a third embodiment of shock absorbing system in conjunction with the explosion generator according to the invention.

Figure 9:
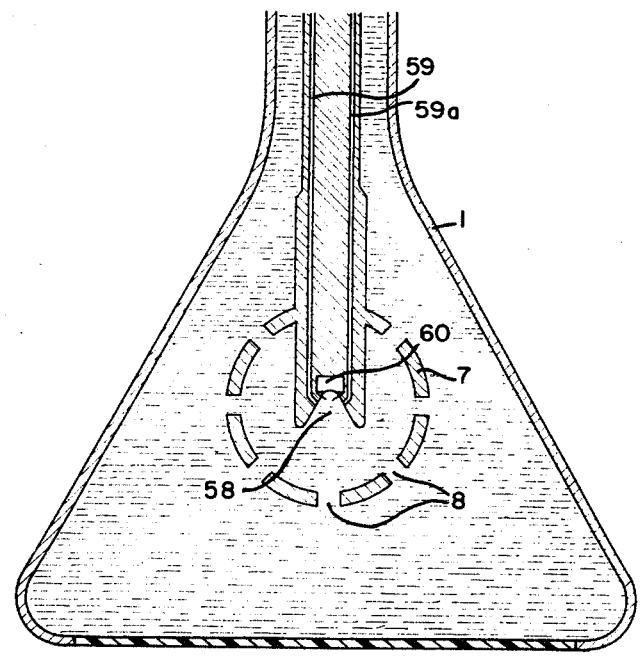

FIG. 9 diagrammatically shows a cross section of a further embodiment of impulse generator provided with a liquid-fuel explosive-mixture system.

Figure 1:
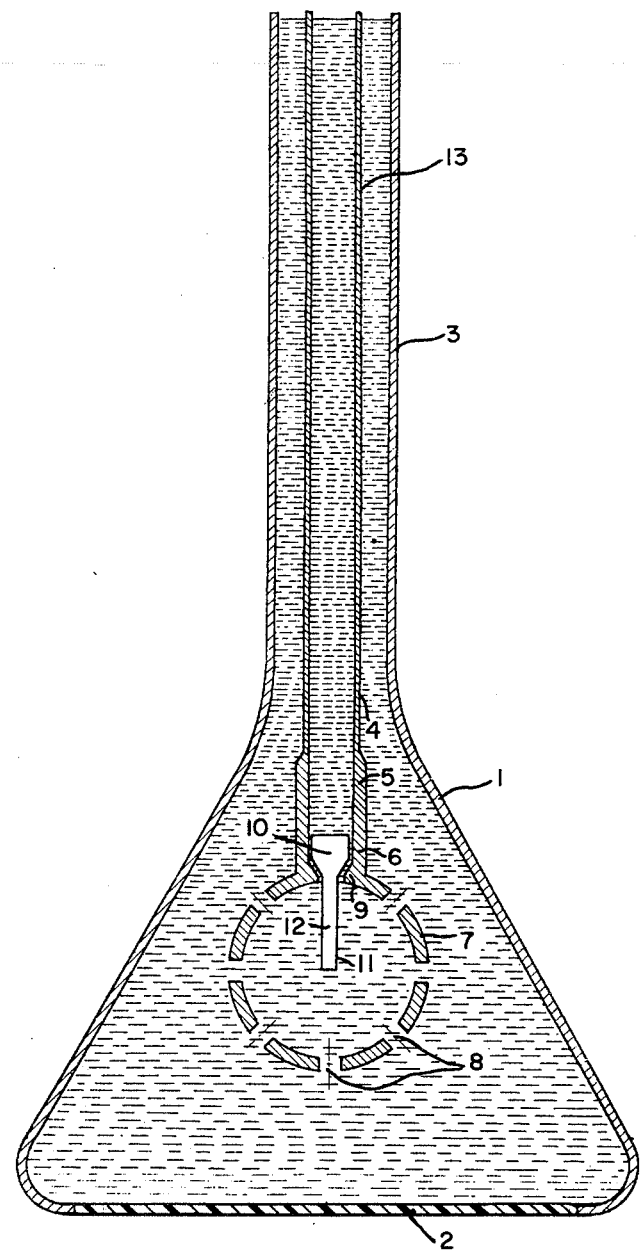

FIG. 1 represents a container 1, with a shell theoretically made out of metal such as steel or of deformable material, having a bottom 2 that is obligatorily made of a deformable material such as linen, rubber or plastic so that it exactly shapes itself to the relief of the ground surface on which the container is placed.

The substantially conic shape of the container, shown by way of example on FIG. 1, provides an appreciable contact surface between the bottom of the container and the ground even with a relatively small container volume. However, a container with an entirely different shape can be used such as, for example, a hemisphere in which the diametric plane would act as the bottom.

According to a preferred embodiment of the invention the container 1 is topped by a tubular filling column 3. Inside this column is placed the explosive charging tube 13 having a submerged part 4 which extends down into the container and ends in terminal 5. Attached to this terminal is another terminal 6 of a sphere 7 which is perforated by numerous orifices 8. Terminal 6 has a central orifice with, preferably, the same diameter as the inside diameter of the tubular column, except for a narrower shoulder part 9 which forms a stop ring forming an abutment for the head 10 of the cartridge 11 but allowing the cylindrical body 12 of the cartridge to pass into the sphere. This cylindrical body should preferably be long enough so that the explosive charge contained therein extends approximately into the center of the sphere when the cartridge head abuts against the stop ring 9.

The main reason for using such a perforated sphere is to restrain the oscillations of the bubble formed upon explosion. Without this arrangement, the bubble, which is elastic and is subjected to the pressure of the liquid around it, generates pulsational phenomena which disturb the seismic recording of the reflected waves.

The liquid filling the container 1 and, at least partially, the tubular column 3, can be any sort of liquid, but it should preferably be electrically conductive. Water is the easiest and most practical liquid for this use.

If greater pressure is desired inside the container, other liquids can be used such as liquids of sufficient conductivity having a higher density than water.

The method of this invention is operated by slipping a cartridge inside the tube 3 until its head comes in abutment against the stop ring 9. Cartridge loading and firing can be effected according to one of the methods described in U.S. Pat No. 3,360,070.

The device described above can be improved by providing innerly the bottom of the container, substantially at the periphery thereof, with a system generating a continuous screen of gas bubbles during the firing period in front of the entire wall of the container which is not in contact with the ground (hereunder referred to as the "side wall"), as well as in front of the tubular part lengthening the top of the container. This screen of bubbles serves to protect the side wall of the container from the breaking effects of the shock wave generated by the explosions.

The system used to create these bubbles may, for example, be a ramp made of explosion resistant material, perforated with holes, and fed with compressed air.

Figure 2:
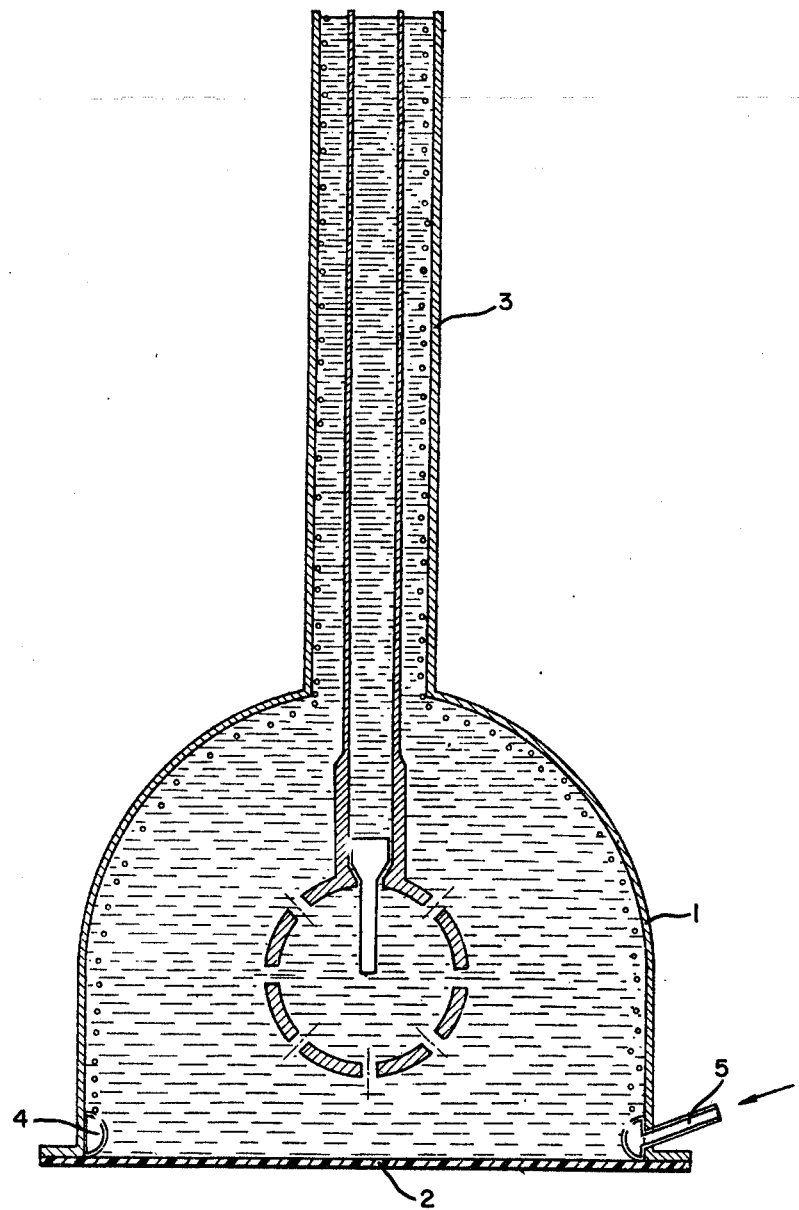

Such a device is illustrated in FIG. 2 which shows a container with a metal side wall 1 whose lower part is hemispherical in shape (one of the shapes mentioned above). This container has a circular bottom 2 made out of deformable material with the same inside diameter as that of the hemisphere and is extended by the tubular upper part 3.

A circular metal ramp with orifices along its entire length is attached to the bottom of the inside of the side wall. Compressed air is fed to this ramp through one or several tubes 5 leading outside to a compressed air generator that is not shown in the diagram.

The ramp is fed with compressed air continuously over the whole firing period so that the air bubbles escaping from each of the ramp orifices rise continuously along the side wall of the container and the surmounting tubular part, thus forming a screen of bubbles in front of this wall during the entire series of explosions.

Figure 3:
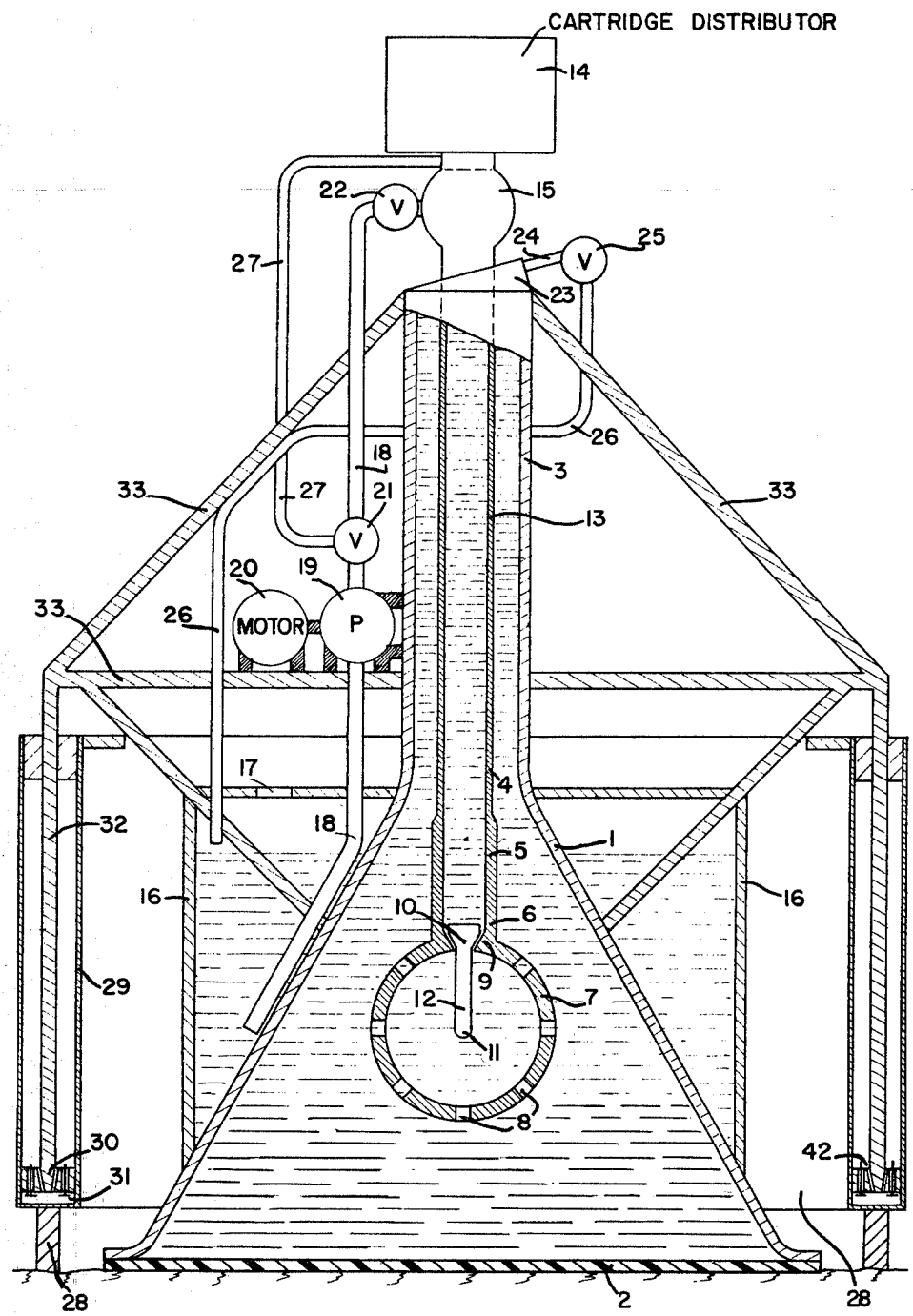
FIG. 3 shows, in pre-explosion position, a partial cross section of a first embodiment of impulse generator unit in conjunction with a first embodiment of shock-absorbing system.

FIG. 3 shows the impulse generator unit of FIG. 1 provided with its loading system in explosive charges in conjunction with a device for absorbing the shock due to the fall of the generator after its projection above the ground by the explosion. Explosive cartridges are fed into the loading tube 13 by means of a cartridge distributing cylinder hereinafter called "distributor" 14 via a two-way valve 15. Both the cylinder and the valve, which are located on the top end of the tube 13 as opposed to the submerged bottom end and are outside of the tubular part 3, may be of the same type as those described in U.S. Pat No. 3,368,641 and operate on the same principle.

A tank 16, attached outside and surrounding container 1, contains a liquid which, for example, may conduct electricity and be of the same kind as that in container 1. An orifice 17 at the top of this container is provided for filling it. A duct 18, one end of which runs into tank 16, conveys the liquid from this tank to valve 15 by way of a pump 19 actuated by a motor 20 through a valve 21 and a nonreturn valve 22.

The tubular part 3 forming the upper part of container 1 is surmounted by a wedge-shaped piece 23 at the top of which opens the end of a duct 24, having its other end connected to a valve 25. This valve 25 is also connected to the tank 16 through a duct 26 which has one end leading into the tank but above the level of the liquid inside the tank (FIG. 3). Another duct 27 connects the valve 21 with the upper part of valve 15.

During the operations leading up to the explosion of one cartridge as part of a series of explosions, this device functions as follows:

Valve 15 is opened to allow cartridges to pass, and distributor 14 releases a cartridge into tube 13. When the cartridge has passed through valve 15, this valve closes and, at the same time, pump 19 driven by motor 20 pumps liquid from tank 16 via duct 18 and, since valve 21 is so positioned that duct 18 is open and duct 27 is closed, this liquid is sent under pressure to valve 15 which opens to allow the passage of the liquid under pressure so that it pushes the cartridge 11 down until its head abuts against the stop ring in the terminal 6 of sphere 7. A nonreturn valve 22 on duct 18 before valve 15 prevents the water from flowing back through this duct during the explosion. During the passage of the cartridge from valve 15 to its seat in the stop ring, an overpressure takes place in the container 1 and in its tubular part 3. The water in excess is then evacuated through duct 24 via valve 25, which is then open, and via duct 26 to tank 16. This operation serves to carry away the gas bubbles generated by the preceding explosion that remain at the top of the tubular part 3. Due to the wedge shape of the upper part of tube 3 and to the opening of duct 24 at the top thereof, a complete evacuation of the gases is secured. A few moments before firing (a few tenths of a second, for example) valve 25 is closed while the water pressure is maintained by pump 19 in the container 1 and in its tubular part 3 which, at this time, no longer contain gas.

At this point, the charge may be fired in the manner, for example described in the French patent application Ser. No. 37,535 filed on Nov. 5, 1965, firing means being not shown in the accompanying drawings. Upon explosion the charge produces a gas bubble whose return pulsation is reduced by the perforated sphere 7, thus preventing the membrane 2 of the container 1 from tearing as the result of a too strong suction effect.

At this point valve 15 is opened so as to evacuate the gases produced by the explosion via the cartridges loading tube 13. Then, with pump 19 still working, as soon as the cartridge for the next explosion has passed valve 15, valve 21 is so actuated that it closes off duct 18 and opens duct 27. Through this latter duct, liquid conveyed from tank 16 to the upper part of valve 15, which has remained in the same position, so as to fill the passage of this valve in communication with tube 13 and thus bring about a complete evacuation of the gases contained in this tube.

A new cycle can then begin.

At the instant when the explosion is set off, a shock wave is produced which creates the seismic signal, and a gas bubble is generated which causes the displacement of a certain amount of water swelling out the membrane 2 which forms the bottom of the container 1. The entire apparatus, of small weight as compared to the explosion force, is then projected above the ground. At this point the apparatus must be prevented from falling heavily back to the ground and thereby creating a parasite sound wave during the period of seismic recording which begins as soon as the shock wave created by the explosion strikes the ground via the intermediary of the membrane 2.

Several methods of shock absorbing adapted to the apparatus have been studied as part of the invention.

Figure 4:
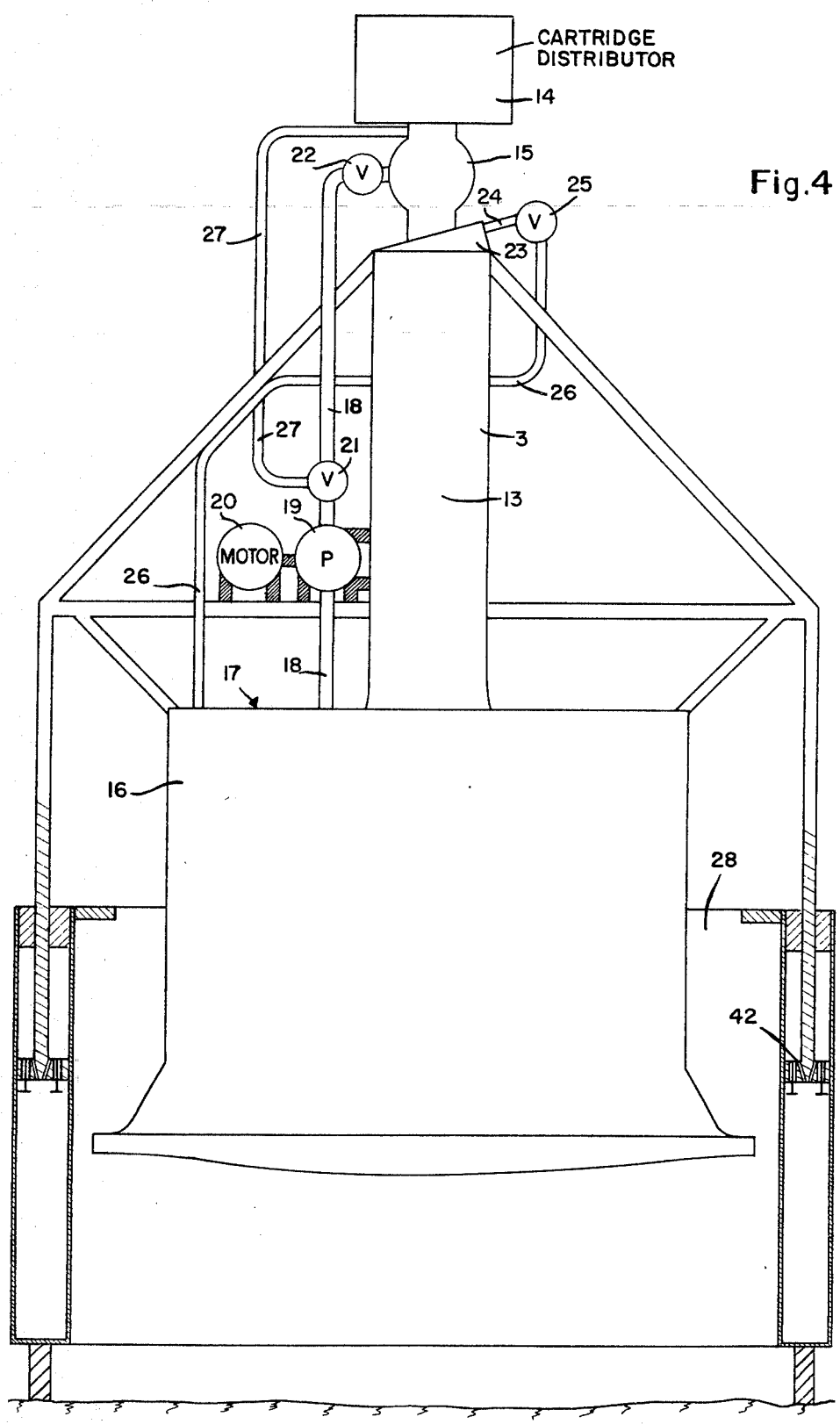
FIG. 4 shows an overall view of the device shown in FIG. 3, in a post-explosion position.

According to a first embodiment shown in FIG. 3, the lower part of the impulse generator is surrounded by a cylinder 28 which may be made out of steel. To the wall of this cylinder are attached for example three or four hydraulic jacks, each of which has a cylinder 29 filled with liquid, such as oil, in which slides a piston 30 provided with valves 31 and small orifices 42. Each piston rod 32 is attached to a metal frame 33 which forms part of the impulse generator. When the generator is projected above the ground by the explosion, it carries along the pistons 30 in its upward movement, while the valves 31 are naturally opened by this movement (FIG. 4). When the generator falls back to the ground, the valves 31 close and the descent of the pistons 30 inside the cylinders 29 is considerably braked by the resistance of the hydraulic liquid on the base of the piston since this liquid can only pass very slowly through the small orifices 42. The impulse generator, consequently, descends slowly back to the ground without creating any undesirable sound waves.

Figure 5:
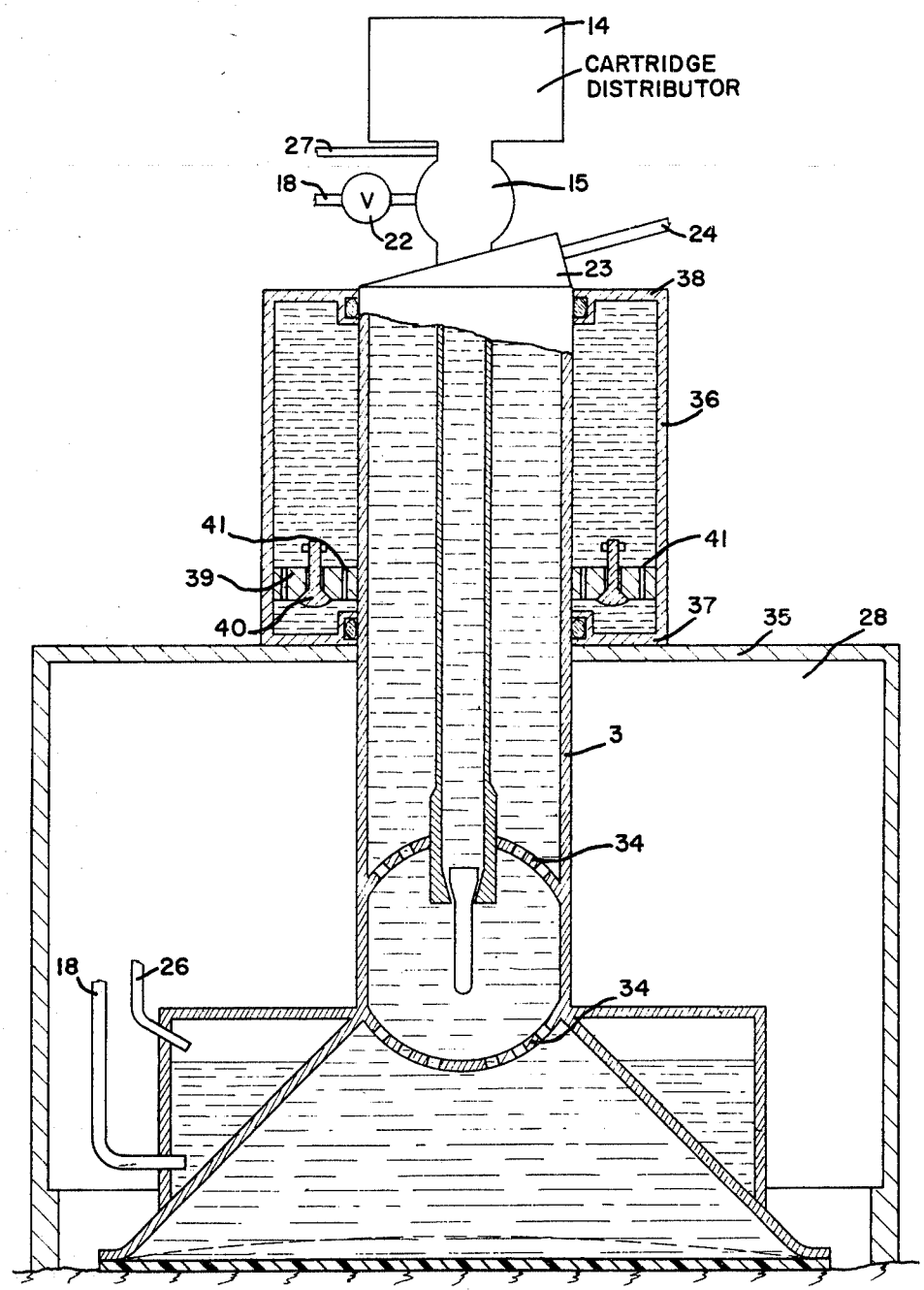
FIG. 5 shows, in a pre-explosion position, a partial cross section of a second embodiment of impulse generator unit in conjunction with a second embodiment of shock-absorbing system.

FIG. 5 shows a second embodiment of impulse generator according to the invention, in combination with a second embodiment of the system for absorbing the shock due to the fall of the generator after the explosion. In this embodiment, the perforated sphere that formerly absorbed the pulsation of the gas bubble generated by the explosion is replaced by two hemispherical grids 34 attached to the lower part of the tubular part 3 and sufficiently distant from each other to provide a housing for the cartridge such that the tip thereof be placed substantially at the center of the enclosure thus formed. The cartridge loading device and its firing means are the same as those shown in FIG. 3. At the moment of the explosion in this case as well as in the other, the impulse generator is projected above the ground. The device for absorbing the shock due to its fall consists of a first cylinder 28 which may be made of steel, which rests on the ground and which encompasses the lower part of the generator but is not attached to it. The upper wall 35 of this cylinder is provided with a hole having about the same size, with a slight clearance for play, as that of the tubular part 3 of the container 1 so that this tubular part can slide into said hole when the container rebounds upwards after the explosion.

A second cylinder 36 centered on the same axis as cylinder 28 has its base 37 resting on top of the upper wall 35 of cylinder 28. Both this base 37 and the upper wall 38 have a hole through which the tubular part 3 can pass. The cylinder 36 is attached to the cylinder 28 and is independent of the impulse generator.

An annular ring-shaped piston 39 is secured to the outside wall of the tubular part 3, its internal diameter corresponding to the external diameter of this tubular part, while its external diameter is adapted to the internal diameter of the cylinder 36 wherein the piston can slide during the rebound of the impulse generator. This piston has several valves 40 and narrow orifices 41. The cylinder 36 is filled with hydraulic liquid (oil, for example).

When the impulse generator is projected above the ground by the explosion, the tubular part 3 drives the piston 39 up into the cylinder 36, with the valves 40 being wide open to allow the hydraulic liquid to pass. When the generator falls back, the valves close, thus braking its fall by means of the resistance of the hydraulic liquid on the base of the piston, the liquid running slowly through the small orifices 41. The container 1 thus sinks gently back to the ground.

The hydraulic brakes used in the above two embodiments can easily be replaced by air brakes working on exactly the same principle.

The entire apparatus can be conveniently soundproofed by a coating such as a conglomerate of cork and rubber.

The surface of contact of the base of cylinder 28 with the ground (FIGS. 3 and 5) is advantageously selected lower than a quarter of the area of the membrane in contact with the ground.

Figure 7:
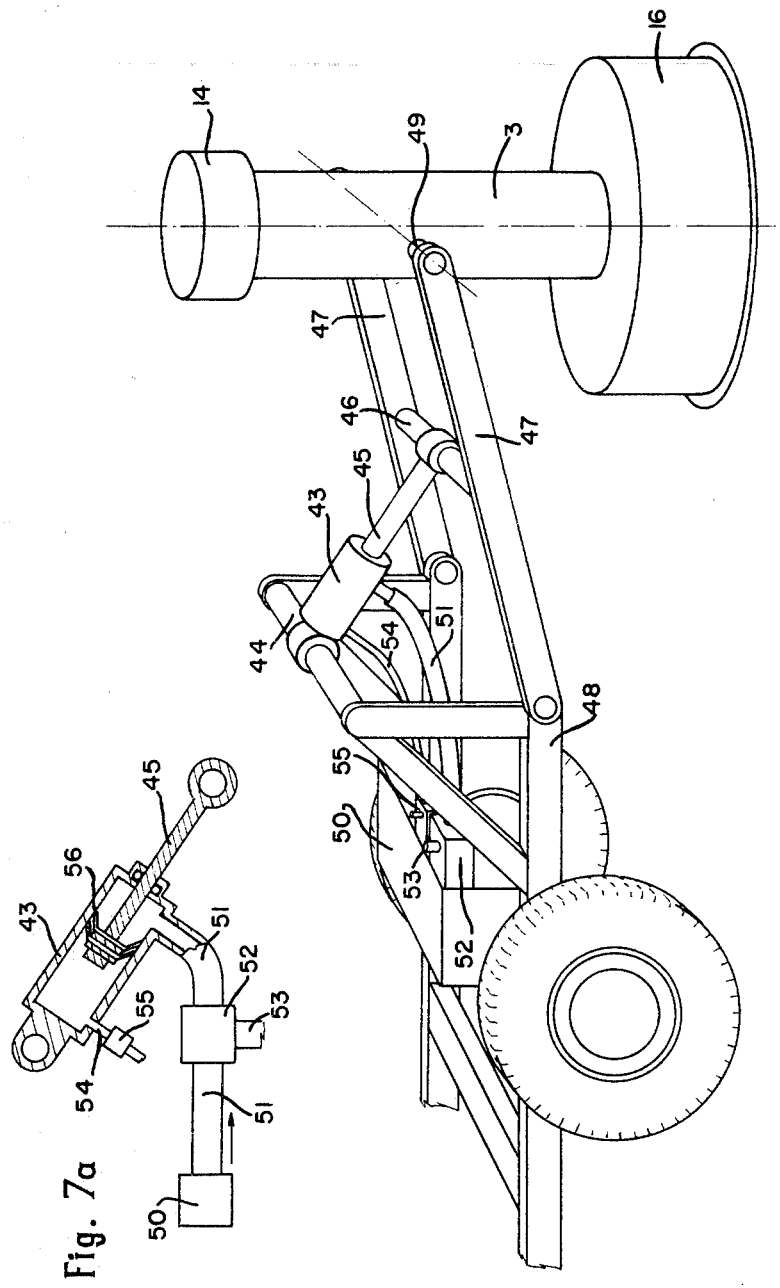

FIG. 7 shows a pneumatic jack system constituting a third embodiment of means for absorbing the rebound of the impulse generator as well as a means of hoisting this generator for transportation when it is not operating.

This hoisting and shock-absorbing apparatus is advantageously located at the rear of a light vehicle. It mainly consists of a pneumatic jack with a cylinder 43, of which one end is pivotally mounted on a rod 44 attached to the rear of the vehicle, and a single piston-rod piece 45 whose end attached to the cylinder 43 is pivotally-mounted on the rod 46 connecting two other arms that are pivotally-mounted on the rear 48 of the vehicle. The impulse generator is associated with this apparatus by its tubular part 3 which is pivotally mounted to a rod 49 attached to the ends of two arms 47.

The cylinder 43 of the pneumatic jack is connected to a compressor 50 (FIGS. 7 and 7a) by a duct 51 on which there is a valve 52. This valve has three positions corresponding, respectively to (1) completely shut, (2) opening the passage between the lower part of the cylinder and duct 53 which leads to the open air, and (3) opening the passage between the duct 51 and the compressor 50. The upper part of the cylinder communicates with the open air by a duct 54 on which there is a valve 55 with two positions corresponding, respectively, to (1) closing and (2) opening this duct.

When the impulse generator is projected above the ground by the explosion, its tubular part 3, the rod 49 and the rod 46 and arms 47 all combine to drive the piston rod 45 which runs into the cylinder 43 and drives the piston 56 (FIG. 7a), which comprise ring seals that allow the air to pass when the piston runs up into the cylinder and provide sealing on the downward stroke. During the upward stroke of the piston, valves 52 and 55 are closed, and the air contained in the upper part of the cylinder is forced into the lower part. When the impulse generator falls back, driving the piston on its downward stroke, the ring seals of the piston provide total sealing by pressing against the wall. In order for the piston to sink back down slowly, the air contained in the upper part being eliminated, it is necessary to provide it with a new amount of air. At the end of the upward stroke of the piston, valve 55 is opened, thus establishing a communication between the upper part of the cylinder and the open air by way of duct 54. At the same time valve 52 is manipulated so as to open up the passage between the lower part of the cylinder and the open air via duct 53 and to drive out the air forced down by the piston on its downward stroke. The diameters of ducts 53 and 54 are specially calibrated so as to allow only a tiny flow of air to pass so that the system will sink down slowly.

For using the pneumatic jack as a hoisting system for transporting the impulse generator, valve 52 is actuated so as to open the passage between the lower part of the cylinder and the compressor 50 through the duct 51. This compressor sends compressed air into the lower part of the cylinder. The piston rises and lifts the entire impulse generator which is then maintained in its elevated position.

Figure 6:
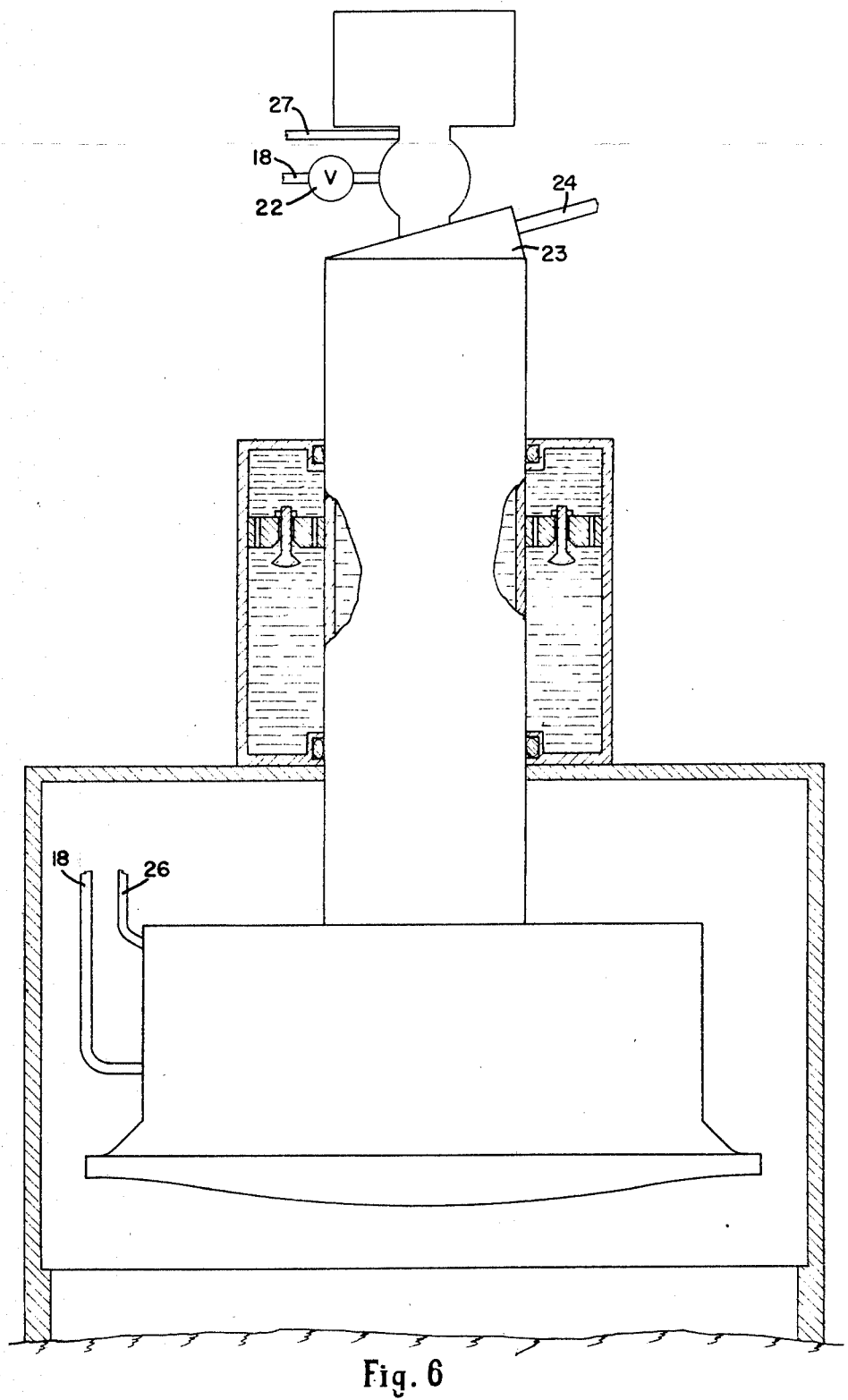
FIG. 6 is a general view of the device shown in FIG. 5, in a post-explosion position.

A jack of this sort can be used effectively with the first two embodiments of the invention for lifting and transporting the apparatus. For example, the cylinder 28 (FIGS. 3 and 4) can be pivotally-mounted on the rod 49 of the lifting system. In the second embodiment, for example, the cylinder 36 (FIGS. 5 and 6) can be connected with the rod 49.

Figure 8:
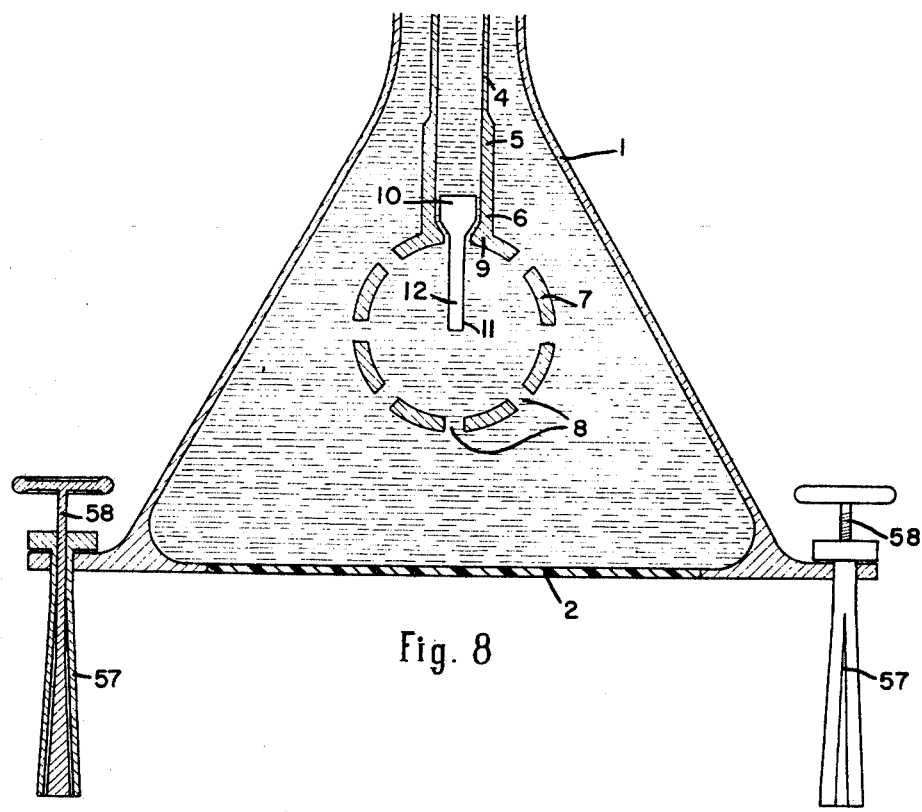
FIG. 8 shows a locking system for the explosion generator preventing its rising up over the ground after explosion.

FIG. 8 shows the case where the impulse generator is prevented from leaving the ground at the time of the explosion by means of locking system using a known type of expansion bolts 57 to fasten the base of impulse generator to the ground.

In the examples described the explosive charges used are cartridges. However, it would also be possible to explode charges of a liquid explosive mixture inside an explosion chamber 58 (FIG. 9) that is open at one end and is set inside a perforated sphere 7 immerged in the container. This explosion chamber is fed with liquid fuels through separate ducts (59 and 59a), and the fuel mixture in the explosion chamber may be set off by a firing system 60 such as the one described in U.S. Pat. No. 3,368,641.

By carrying out several succesive explosions at the same point and by using identical charges, the excellent reproducibility of the signal produced by the explosion will considerably improve the signal-noise ratio by making a summation of the traces corresponding to successive firings.

Explosions can also be set off that provide better recordings at different points, so as to filter the parasite surface waves as is usually done in seismic prospecting.

Furthermore, the instant of the explosion is known with a great precision which simplifies summation of the traces.

Under such conditions, the explosion of a great charge can be replaced by a series of weaker sequential explosions, which is obviously quite advantageous in considerably reducing the surface damage caused by the explosions.

Lastly, the apparatus used in applying this invention is easily portable, thus considerably reducing the time spent in seismic prospecting over a given area or else enabling a much larger area to be covered than can be done by standard methods in a given period of time. The simplicity of the method and of the apparatus it uses results in a very appreciable reduction in the cost of seismic prospecting while excellent ground transmission efficiency of the energy produced, is achieved.

What is claimed is:
1. In a device for seismic prospecting on land comprising a container filled with liquid having a bottom made of deformable material resting on the ground and a head, means for delivering explosive cartridges to a location within said container, said means for delivering comprising tube means extending from said head to said location and having a first end at said head and a second end at said location, means for feeding explosive cartridges into said first end, means for firing said explosive cartridges at said second end comprising conductor means associated with said tube means and switching means for controlling by the closure of an electric circuit said firing means at the times selected for the explosions, the improvement of means for sequentially conveying said explosive cartridges through said tube means from said head to said location, said means comprising means for generating a stream of liquid throughout said tube means including tank means at least partially filled with liquid associated with said container, duct means with pump means and valve means comprising a two-way valve, for withdrawing liquid from said tank means and forcing it under pressure to said first end of said tube means, valve means at least partially preventing return of the liquid from said tube means connected to said duct means intermediately between said pump means and said two-way valve and liquid discharging duct means from said head to said tank means.

References Cited
UNITED STATES PATENTS

| | | | |
|---|---|---|---|
| 3,283,844 | 11/1966 | Peterson. | |
| 1,500,243 | 7/1924 | Hammond | 181—0.5 |
| 1,856,912 | 5/1932 | Gebe et al. | 102—21 |
| 2,316,596 | 4/1943 | Kennedy | 102—23 |
| 2,667,122 | 1/1954 | Burrows et al. | 102—224 |
| 2,699,117 | 1/1955 | La Prairie | 102—23 |
| 2,772,746 | 12/1956 | Merten | 181—0.5 |
| 2,846,019 | 8/1958 | Lang | 181—0.5 |
| 2,877,859 | 3/1959 | Knudsen | 181—0.5 |
| 3,034,595 | 5/1962 | Thompson | 181—0.5 |
| 3,070,010 | 12/1962 | Robinson | 175—4.5 |
| 3,212,437 | 10/1965 | Saling | 102—22 |
| 3,215,223 | 11/1965 | Kirby et al. | 181—0.5 |
| 3,235,027 | 2/1966 | Kilmer | 181—0.5 |
| 3,260,327 | 7/1966 | McCollum | 181—0.5 |
| 3,274,933 | 9/1966 | Robinson et al. | 102—21.6 |
| 3,275,098 | 9/1966 | Filler | 181—0.5 |
| 3,289,784 | 12/1966 | Cassand et al. | 181—0.5 |
| 3,306,392 | 12/1967 | Kilmer | 181—0.5 |
| 3,310,128 | 3/1967 | Chelminski | 181—0.5 |
| 3,314,497 | 4/1967 | Kilmer | 181—0.5 |

FOREIGN PATENTS 1,422,837  11/1965  France.

BENJAMIN A. BORCHELT, Primary Examiner

J. FOX, Assistant Examiner